US006138075A

United States Patent [19]

Yost

[11] Patent Number: 6,138,075
[45] Date of Patent: Oct. 24, 2000

[54] METHODS AND APPARATUS FOR ANALYZING SEISMIC DATA

[75] Inventor: Lawrence W. Yost, Littleton, Colo.

[73] Assignee: Landmark Graphics Corporation, Houston, Tex.

[21] Appl. No.: 09/129,379

[22] Filed: Aug. 5, 1998

[51] Int. Cl.[7] .................................................. G06F 19/00
[52] U.S. Cl. ............................................................ 702/14
[58] Field of Search .......................... 367/72, 73; 702/14, 702/16, 17

[56] References Cited

U.S. PATENT DOCUMENTS

| | | | |
|---|---|---|---|
| 4,460,059 | 7/1984 | Katz | 181/102 |
| 4,633,401 | 12/1986 | Flinchbaugh | 364/421 |
| 4,745,562 | 5/1988 | Prazdny | 364/551 |
| 5,056,066 | 10/1991 | Howard | 367/72 |
| 5,148,494 | 9/1992 | Keskes | 382/1 |
| 5,153,858 | 10/1992 | Hilbebrand | 367/72 |
| 5,179,518 | 1/1993 | Keskes et al. | 364/421 |
| 5,226,019 | 7/1993 | Bahorich | 367/74 |
| 5,251,184 | 10/1993 | Hildebrand et al. | 367/72 |
| 5,268,994 | 12/1993 | Keskes | 395/121 |
| 5,440,525 | 8/1995 | Dey-Sarkar et al. | 367/52 |
| 5,563,949 | 10/1996 | Bahorich et al. | 364/421 |

FOREIGN PATENT DOCUMENTS

| | | |
|---|---|---|
| 2096095 | 5/1993 | Canada . |
| 0 181 216 | 11/1985 | European Pat. Off. . |
| WO 96/18915 | 6/1996 | WIPO . |
| WO 97/13166 | 4/1997 | WIPO . |

OTHER PUBLICATIONS

Aftab Alam, et al., "Advances in 3D Seismic Fault Interpretation," 1994.

A. Alam, et al., "3–D Interpretation Using Interactive Graphics".

F. Aminzadeh, "Image Processing and Pattern Recognition in Exploration Geophysics," 1986.

Mike S. Bahorich, et al., "Stratigraphic and Structural Interpretation with 3–D Coherence," 1995.

Michael S. Bahorich, et al., "Seismic Sequence Attribute Map (SSAM)".

Mike Bahorich, et al., "3–D Seismic Discontinuity for Faults and Stratigraphic Features: The Coherence Cube," 1995.

Mike Bahorich, et al., "Stratigraphic Interpretation of Seismic Data on the Workstation," 1994.

Mike S. Bahorich, et al., "3–D Seismic Discontinuity for Faults and Stratigraphic Features: The Coherence Cube," 1995.

Michael S. Bahorich, et al., "Static Corrections on the Southeastern Piedmont of the United States," 1982.

Mike Bahorich, "The Seismic Sequence Atribute Map (SSAM)," 1994.

Arthur E. Barnes, "Theory of 2–D Complex Seismic Trace Analysis," 1996.

D. Bhaskara Rao, et al., "A Fortran–77 Computer Program for Three–Dimensional Analysis of Gravity Anomalies with Variable Density Contrast," 1991.

(List continued on next page.)

Primary Examiner—Donald E. McElheny, Jr.
Attorney, Agent, or Firm—Townsend and Townsend and Crew LLP

[57] ABSTRACT

The invention provides methods and systems for analyzing seismic data. In one method, a set of three-dimensional seismic signal traces are provided. A reference of one of the traces is compared with at least two neighboring traces to find a neighbor trace with the least or most similarity to the reference trace. This neighbor trace is defined as a target trace. The reference trace is then compared with the target trace to produce a comparison value which is saved for later output or display.

21 Claims, 10 Drawing Sheets

OTHER PUBLICATIONS

Thomas N. Bishop, et al., "Correcting Amplitude, Time, and Phase Mis–Ties in Seismic Data".

B. Boiardi, et al., "Signal Coherence Measure in Seismic Data Processing," 1989.

Bruno Boiardi, et al., "The Signal Coherence as a Versatile Diagnostic Tool to Improve Seismic Data Processing Effectiveness," 1991.

Marion R. Bone, et al., "Analysis of Seismic Data using Horizontal Cross–Sections," 1983.

Patricia Boronad, et al., "Stacking Migrated Shot Profiles by Image Processing," 1989.

J.D. Bouvier, et al., "Three–Dimensional Seismic Interpretation and Fault Sealing Investigations, Nun River Field, Nigeria," 1989.

E.C. Brede, et al., "Interactive Fault Mapping: A Case Study," 1986.

M. Brink, et al., "Evaluation of 3–D Coverage Specs–A Case Study," 1993.

Alistair R. Brown, "Structural Interpretation from Horizontal Seismic Sections," 1983.

Alistair R. Brown, Interpretation of Three–Dimensional Seismic Data (Chapter 3), ©1991.

A.R. Brown, et al., "A Stratigraphic Case History Using Three–Dimensional Seismic Data in the Gulf of Thailand," 1981.

Alistar R. Brown, et al., "Fault Slicing—A New Approach to the Interpretation of Fault Detail," 1987.

Alistar R. Brown, "A Coherent Approach to 3–D," 1997.

Hermann Buchholtz, "Three–Dimensional Seismic–Reflection Techniques," 1988.

Luis L. Canales, et al., "3–D Trace Interpolation in the f–x–p Domain".

C. Cardaci, et al., "Cross–Correlation Analysis of Seismic and Volcanic Data at Mt Etna Volcano, Italy," 1993.

John P. Castagna, et al., "Comparison of AVO Indicators: A Modeling Study," 1994.

Jon F. Claerbout, "3–D Local Monoplane Annihilator," 1993.

Jon F. Claerbout, "3–D Data Infill and Extrapolation," 1993.

Jon F. Claerbout, "Information from Smiles: Mono–Plane–Annihilator Weighted Regression," 1992.

J. F. Claerbout, Blackwell Scientific Publications, Chapter 7, 1992.

J. F. Claerbout, Blackwell Scientific Publications, Chapter 8, 1992.

D.L. Connelly, et al., "Northwestern Williston Basin Case Histories with 3–D Seismic Data," 1991.

Yao–Chou Cheng, et al., "The Binary Consistency Checking Scheme and Its Applications to Seismic Horizon Detection," 1989.

C.G. Dahm, et al., "Field Development with Three–Dimensional Seismic Methods in the Gulf of Thailand—A Case History," 1982.

R.M. Dalley, et al., "Dip and Azimuth Displays for 3D Seismic Interpretation," 1989.

Geoffrey A. Dorn, et al., "Detailed Fault Interpretation of 3–D Seismic Data for EOR Planning," 1989.

John H. Doveton, Geologic Log Analysis Using Computer Methods, Chapter 6, 1994.

Radivoj Drecun, et al., "Enhancement of Edge Patterns on Horizontal Time Slices".

Jean Dumay, et al., "Multivariate Statistical Analyses Applied to Seismic Facies Recognition," 1988.

C. Patrick Ervin, et al., "Automated Analysis of Marine Refraction Data: A Computer Algorithm," 1983.

Michael E. Enachescu, "Amplitude Interpretation of 3–D Reflection Data," 1993.

D.J. Foster, et al., "A Closer Look at Hydrocarbon Indicators," 1994.

Wayne R. Gibson, et al., "3–D Seismic has Renewed the Search for Stratigrahic Traps," 1992.

Robert J. Greaves, et al., "Three–Dimensional Seismic Monitoring of an Enhanced Oil Recovery Process," 1987.

N. Gulunay, et al., "Prediction Filtering for 3–D Poststack Data," 1993.

Robert M. Galbraith, et al., "Field Appraisal with Three–Dimensional Seismic Surveys Offshore Trinidad," 1982.

Anthony C. Gerhardstein, et al., "Interactive Interpretation of Seismic Data," 1984.

E. Harrigan, et al., "3D Event Tracking Using Cross–Probabilistic Data Association (XPDA)".

Norman L. Haskell, et al., "3–D Seismic Coherence and the Imaging of Sedimentological Features," 1995.

P. Haskey, et al., "Applications of Real–Time 3d Processing".

H.L.J.G. Hoetz, et al., "Seismic Horizon Attribute Mapping for the Annerveen Gasfield, The Netherlands," 1992.

S. Horvath, "The Effectiveness of Offshore Three–Dimensional Seismic Surveys—Case Histories," 1985.

L.M. Houston, et al., "Multiple Suppression using a Local Coherene Filter".

Peter Hubral, et al., "Interval Velocities from Seismic Reflection Time Measurements," 1980.

Fethi Ben Jemma, et al., "Effect of Parameter Cross–Correlation on Groundwater Sampling Design," 1991.

Ernest R. Kanasewich, et al., "Imaging Discontinuites on Seismic Sections," 1988.

Martin karrenbach, "Three–Dimensional Time–Slice Migration," 1990.

John Kerr, et al., "Continuity: A New Interpretation Tool," 1996.

N. Keskes, et al., "Automatic Extraction of 3–D Seismic Horizons," 1983.

N. Keskes, et al., "Application of Image Analysis Techniques to Seismic Data," 1982.

N. Keskes, et al., "Les techniques d'analyse d'images au service de l'interprétation structurale des données sismiques 3D et 2D," 1992 (English translation attached).

N. Keskes, et al., "Image Analysis Techniques for Seismic Data," 1982 (SEG Annual International Meeting—Abstracts).

N. Keskes, et al., "Image Analysis Techniques for Seismic Data," S16.7, 1982 (SEG Annual International Meeting and Exposition—Technical Program Abstracts and Biographies).

Naamen Keskes, et al., "Image Processing as a Tool for Interpreting 3D and 2D Seismic Data," 1991.

Naamen Keskes, et al., "Statistical Study of Edges in TV Pictures," 1979.

Naamen Keskes, "Image Analysis Techniques Applied to 2D and 3D Seismic Data," 1994.

Naamen Keskes, et al., "Seismic Horizon Extraction by Heuristic Methods," 1983.

N. Keskes, et al.,"Application of an Interactive Statistical Classification System to the Analysis of High Resolution Dipmeter Curves," 1987 (Vol. I, Paper O).

Harald Kirchner, "Blockmatching with Column and Row Oriented Optimization," 1990.

Klaus–Peter Karmann, et al., "Moving Object Recognition Using an Adaptive Background Memory," 1990.

W.S. Kowalik, et al., Chevron's Geolmage—Enhancement and Stereoscopic Viewing of Seismic Horizons and Other Grids for Improved Data Understanding and Communciation, 1995.

Jerome R. Krebs, "Three–Dimensional Migration of Swath Surveys," 1990.

E. Landa, et al., "A Method for Detection of Diffracted Waves on Common–Offset Sections," 1987.

Ken Larner, et al., "In Quest of the Flank," 1989.

H.J. Lehmann, et al., "Practical Aspects of the Determination of 3–D Stacking Velocities," 1985.

V. Lendzionowski et al., "Seismic Character Mapping Over Reservoir Intervals," 1990.

John N. Louie, et al., "Three–Dimensional Imaging of Steeply Dipping Structure Near the San Andreas Fault, Parkfield, California," 1988.

Y. Luo, et al., "Edge Detection and Stratigraphic Analysis Using 3D Seismic Data," 1996.

D. Bradford Macurda, Jr., et al., "Interactive Interpretation of a Submarine Fan, Offshore Ireland: A Case History," 1988.

Michel Manin, et al., "Comparison of Seismic Results After Dip and Strike Acquisition".

A.S.J. McQuaid, et al., "Surely that's Not Seismic! The Benefits of Image Processing".

Ron McWhorter, et al., "Palacios Field: A 3–D Case History," 1995.

Bernd Milkereit, et al.,"Noise Suppression and Coherency Enhancement of Seismic Data," 1990.

M. Hugh Miller, Jr., et al., "Time Slices from Two–Dimensional Seismic Surveys," 1989.

Hugh G. Miller, et al., "Semiquantitative Techniques for the Identification and Removal of Directional Trends in Potential Field Data," 1994.

Olivier Monga, et al., "A Hierarchical Algorithm for the Segmentation of 3–D Images," 1986.

Jaap C. Mondt, "Use of Dip and Azimuth Horizon Attributes in 3D Seismic Interpretation," 1993.

E.O. Nestvold, "3–D Seismic: Is The Promise Fulfilled?" 1992.

E.O. Nestvold, "3D Seismic: A Strategic Tool in Exploration and Production".

Susan E. Nissen, et al., "3–D Seismic Coherency Techniques Applied to the Identification and Delineation of Slump Features," 1995.

James K. O'Connell, et al., "Bullwinkle: A Unique 3–D Experiment," 1993.

R.F. O'Doherty, et al., "A Method of Computing Instantaneous Frequency and Dip".

Richard Ottollni, et al., "On–line Movies of Reflection Seismic Data with Description of a Movie Machine," 1984.

Greg A. Partyka, et al., Seismic Character Mapping Using Multivariate Statistical Pattern Integration, 1993.

F.M. Peterson, et al., "Three–Dimensional Seismic Exploration–A Cost–Effective Approach," 1989.

Harald s. Poelchau, "Coherence Mapping—An Automated Approach to Display Goodness–of–Correlation Between Wells in a Field," 1987.

Normal Pullin, et al., " Techniques Applied to Obtain Very High Resolution 3–D Seismic Imaging at an Athabasca Tar Sands Thermal Pilot," 1987.

Sandra K. Raeuchle, et al., "3–D Seismic Data for Field Development: Landslide Field Case Study," 1991.

Murali Ramaswamy, et al., "Autocorrelation Estimation Using Constrained Iterative Spectral Deconvolution," 1989.

Erwin Rieser, et al., "Frontier Exploration Techniques Appled to Multivintage 2D Seismic".

E.J.H. Rijks, et al., "Attribute Extraction: An Important Application in any Detailed 3–D Interpretation Study," 1991.

Walter R. Roest, et al., "Magnetic Interpretation using the 3–D analytic Signal," 1992.

Adrienne Rogers, "Developments in Geophysical Exploration Methods–2. Chapter 1: Determination of Statics Corrections," 1981.

Richard D. Rosencrans, "Cost–effective 3–D Seismic Survey Design," 1992.

Tim Ellis Scheuer, et al., "Local Phase Velocity from Complex Seismic Data," 1988.

Philip S. Schultz, et al., "A Post–Stack Method for 3–D Crossline Statics Estimation".

Philip S. Schultz, et al., "Poststack Estimation of Three–Dimensional Crossline Statics," 1984.

P.S. Schultz, et al., "Stratigraphic Processing of 3D Seismic by Concurrent Analysis of Surface and Borehole Data," 1990 (North Sea Oil and Gas Reservoirs; II, Proceedings ofthe North Sea Oil and Gas Reservoirs Conference.

Philip S. Schultz, et al., "Stratigraphic Processing of 3–D Seismic by Concurrent Analysis of Surface and Borehole Data".

Philip S. Schultz, "Seismic Data Processing: Current Industry Practice and New Directions," 1985.

Hiromasa Shima, "2–D and 3–D Resistivity Image Reconstruction using Crosshole Data," 1992.

Lars Sonneland, et al., "Application of Seismic Wave Field Attributes in Reservoir Characterization," 1989.

L. Sonneland, et al., "Use of Seismic Attributes in Reservoir Characterization," 1990.

Martin R. Stytz, et al., "Using Kriging for 3D Medical Imaging," 1993.

Paul Switzer, et al., "Estimation of Atmospheric Path–Radiance by Covariance Matrix Method," 1981.

M. Turhan Taner, et al., "Seismic Attributed Revisited," 1994.

Clifford H. Thurber, et al., "Three–Dimensional Seismic Imaging," 1987.

L.A. Tilbury, et al., "Image Processing of Interpreted 3D Seismic Data to Enhance Subtle Structural Features/Lineations," 1991.

Steven Tobias, "Expansion Profiles and Sequence Stratigraphy: A New Way to Identify Systems Tracts, Sequence Boundaries, and Eustatic Histories," 1990.

John Toldi, "Velocity Analysis Without Picking".

Milovan Urosevic, et al., "Application of 3–D Seismic Methods to Detection of Subtle Faults in Coal Seams".

Marin van Heel, et al., "Correlation Functions Revisited," 1992.

Donald A. Vossler, "Automatic Delineation of Lateral Facies Changes in Clastic Environments," 1989.

Donald A. Vossler, "Automatic Whole Section Seismic Reflection Mapping," 1988.

Robert H. Wolfe, Jr., et al., "Interactive Three–Dimensional Seismic Display by Volumetric Rendering," 1988.

Hong Yan, "Skew Correction of Document Images using Interline Cross–Correlation," 1993.

Ozdogan Yilmaz, "Interpretation of 3–D Seismic Data," 1987.

Hau–wei Zhou, "Traveltime Tomography with a Spatial–Coherency Filter," 1993.

Chengnan Zhu, et al., "Seismic Data Processing and Interpretation of the Regina Trough in Southern Saskatchewan, Canada".

Product Literature from Advance Geophysical Corporation, "Seismic Sequence Attribute Analysis".

Product Brochure, The Seisworks Family.

Spatio–Temporal Image Processing, "Theory and Scientific Applications," Chapter 5 (Springer–Verlag).

METHODS AND APPARATUS FOR ANALYZING SEISMIC DATA

BACKGROUND OF THE INVENTION

This invention relates generally to the field of seismic data, and in particular to the processing and analyzing of seismic data to assist in the interpretation of faults or stratigraphic features within the seismic data.

The use of three-dimensional seismic data to analyze subsurface geological structures, such as faults or other stratigraphic features, is becoming increasingly more important to interpreters. For example, seismic data is commonly being employed to identify faults and stratigraphic features to facilitate the location of hydrocarbon reservoirs. In this way, wells may more accurately be positioned to facilitate hydrocarbon recovery.

As computer technology continues to advance, the use of computer workstations to process three-dimensional seismic data is becoming widespread. As such, methods for obtaining three-dimensional seismic data and inputting such data into computer work-stations are known. For example, such techniques are described in U.S. Pat. Nos. 5,563,949 and 5,724,309, the complete disclosures of which are herein incorporated by reference.

Once the three-dimensional seismic data is input into the computer workstation, the data must be processed and analyzed to produce a meaningful output. Because of the usefulness of the seismic data, many in the oil industry are now searching for effective ways to analyze the data to produce an accurate delineation of faults or stratigraphic features. As one example, Elf-Aquatain has published an article describing their Seismage software to assist in locating faults. See Naamen Keskes and Jacqueline Kamy-Peyret, "Seismage: Image Analysis Techniques as a New Tool for Structural Interpretation of Seismic Data", *BULL. CENTRES RECH. EXPLOR. PROD. Elf-Aquatain*, 15, 2, 271–278, Dec. 4, 1991, the complete disclosure of which is herein incorporated by reference.

Although some software does exist to process and analyze three-dimensional seismic data, improvements are still needed. Hence, it would be desirable to provide methods and apparatus for processing and analyzing seismic data that are efficient and minimize analysis time. Such methods should also be robust so that they are useful with a wide variety of data sets. Further, such methods should be able to effectively display fault surfaces or stratigraphic features.

SUMMARY OF THE INVENTION

The invention provides exemplary methods and systems for analyzing seismic data. According to one exemplary method, a set of three-dimensional seismic signal traces are provided. One of these traces is selected as a reference trace and is compared with one or more, and preferably two or more, neighbor traces to statistically select a target trace from the neighbor traces. For example, the target trace may be selected based on whether it is the most or least similar to the reference trace. The reference trace is then compared to the target trace to produce a comparison value. This value is then saved and may optionally be displayed, preferably in vertical view or map view. Such a method is particularly advantageous in that a comparison may be run to determine which of the neighboring traces is least (or most) similar to the reference trace. Once this trace is identified, a comparison is run between the reference trace and the target trace. Because it is desirable to perform a comparison in a direction that is generally perpendicular to a fault, the invention provides a way to determine where the fault likely lies. Once this direction is determined, the resulting comparison is performed in that direction, i.e. generally perpendicular to the fault.

Once a comparison value has been produced for the reference trace, another trace is selected as the reference trace and the same process is repeated to produce a comparison value for the second reference trace. This process is repeated until a comparison value is produced for each seismic trace in the set.

The comparison of the reference trace with the neighboring traces may occur in one or more, and preferably two or more, directions. For example, when analyzing the data, the seismic traces may be arranged in three lines. If the reference trace is in the middle line, comparisons may be made with neighboring traces in the same line, and/or with traces in the lines adjacent to the middle line. In one particular aspect, the reference trace is a center trace which is compared with eight adjacent neighbor traces that are located in three different lines of seismic traces.

After a comparison value is produced for the first reference trace, the second reference trace is preferably the next trace in the middle line, i.e., the trace immediately adjacent the first trace. This process is repeated trace by trace down the middle line. Once the traces in the middle line have been assigned comparison values, another line of traces is read and the process is repeated.

A wide variety of mathematical comparisons may be performed between the reference trace and the neighboring traces. For example, the reference trace may be compared with the neighboring traces using a semblance comparison, a coherency comparison, a dissimilarity comparison, or the like. Similarly, a variety of mathematical comparisons may be used when comparing the target trace with the reference trace. One exemplary comparison is a Manhattan similarity comparison. Such a comparison is advantageous in that it is a first order calculation and is therefore faster to process. In one particular aspect, the comparison of the reference trace with the neighboring traces is discarded prior to comparing the reference trace with the target trace.

One particular advantage of the invention is that the identification of the target traces allows for various quality control issues to be addressed. For example, once each target trace in the volume has been identified, this information could be output and viewed to illustrate problem areas in the data, to help decide on a specific target selection algorithm, or to apply a process to this field to "clean up the noise." If the data were processed to clean the noise in the target field, the cleaned up data could then be used in the evaluation stage where the reference traces are compared with the target traces.

The invention further provides an exemplary computer system which comprises a reading device to read stored seismic data, a processor, and a memory. The computer system further includes code to operate the reading device to read into the memory a set of three-dimensional seismic signal traces. Code is also included to compare with the processor a reference trace with one or more, and preferably two or more, neighboring traces to find a neighbor trace of least (or most) similarity to the reference trace and define this trace as a target trace. The computer system further includes code to compare with the processor the reference trace with the target trace to produce a comparison value. Further, code is provided to save the comparison value in memory.

In one aspect, the computer system further includes a display screen and code to display the comparison value on the display screen. In another aspect, the computer system includes a printer and code to print the comparison value, preferably in vertical view or map view.

In still another aspect, the invention provides a machine readable medium for storing the code. In this way, the code may be transferred to other computer systems.

DETAILED DESCRIPTION OF THE SPECIFIC EMBODIMENTS

Figure 1:
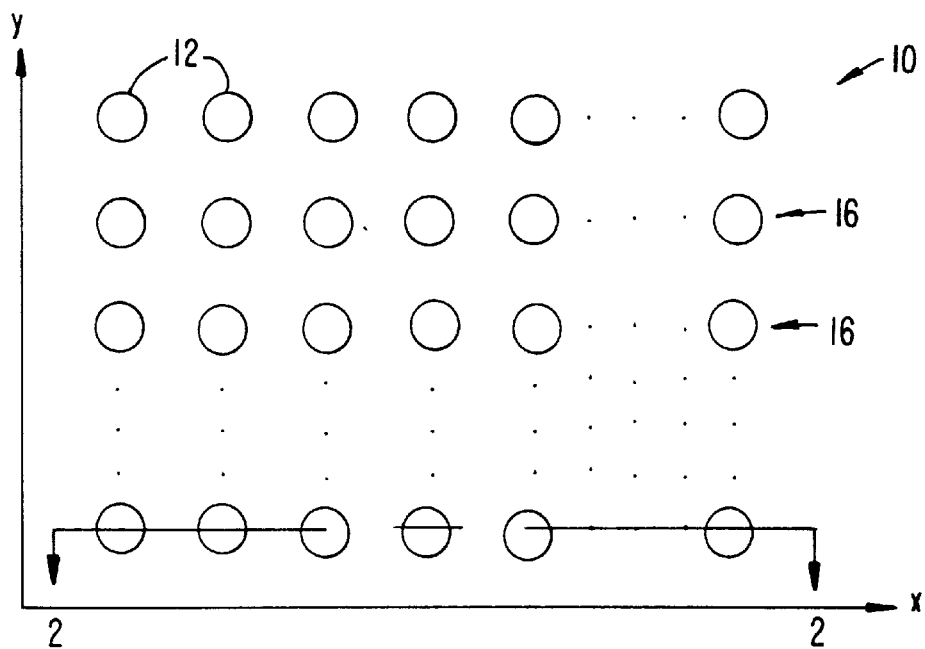
FIG. 1 is a top schematic view of a set of three-dimensional seismic signal traces located at uniform grid locations according to the invention.
Figure 2:
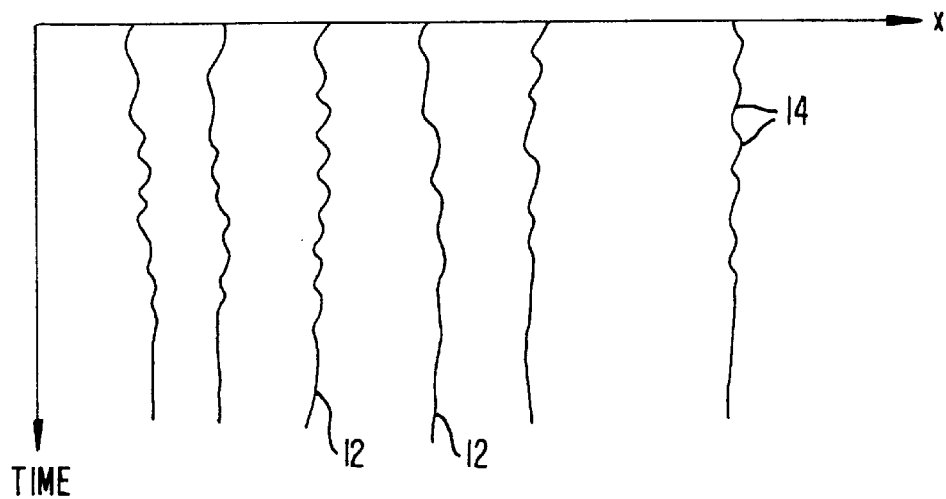
FIG. 2 is a side view of a line of seismic signal traces of the seismic data of FIG. 1 taken along lines 2—2.

The invention provides exemplary methods and systems for analyzing seismic data. The seismic data to be analyzed is preferably three-dimensional seismic data, although the invention may also be used with two-dimensional seismic data. As illustrated in FIG. 1, a set 10 of three-dimensional seismic data comprises a plurality of vertical traces 12 disposed at uniform grid locations at the ground or sea surface. For convenience of illustration, each trace 12 is schematically illustrated by a circle when visualized in top plan view. As shown in FIG. 2, each trace 12 contains a plurality of samples 14 or values that describe the result of subsurface geology interacting with elastic waves generated and recorded at or near the surface as is known in the art. Conveniently, traces 12 may be organized into lines 16 as illustrated in FIG. 1.

Figure 3:
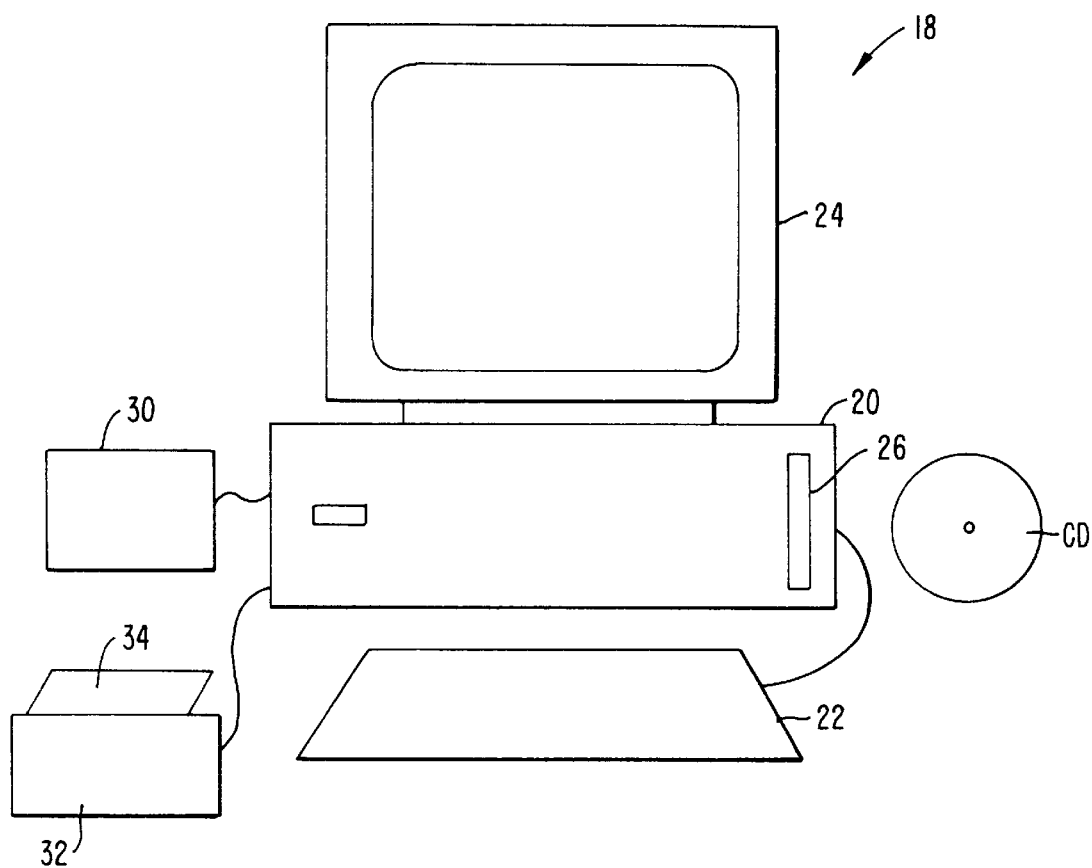
FIG. 3 is a schematic view of an exemplary computer system for processing seismic data according to the invention.

Once the seismic data is supplied and processed into the form illustrated in FIGS. 1 and 2, it is ready for analyzation. Preferably, data set 10 is analyzed with a computer system 18 as illustrated in FIG. 3. Computer system 18 includes a central processing unit 20 to which is coupled an entry device 22, such as a keyboard, and a display screen 24. CPU 20 further includes a read/write device 26 to allow various information to be transferred into and retracted from CPU 20. For example, read/write device 26 may be employed to read information from and write information onto a compact disc 28. Other suitable forms of media include floppy discs, optical disks, and the like. Also coupled to CPU 20 is a reader 30 for reading in bulk stored data into CPU 20. Reader 30 is particularly useful in reading the seismic data into CPU 20. Also coupled to CPU 20 is a printer or plotter 32 for printing data processed by CPU 20. For example, plotter 32 may be used to produce a map 34. An exemplary computer system that may be used with the invention comprises an Indigo II workstation, and corresponding monitor, based on the 32 bit MIPS RISC R4400 microprocessor from Silicone Graphics Inc., Mountain View, Calif. This system has a R4400, 250 mhz chip with 256 megabytes of RAM and 12 gigabytes of disc storage capacity, although other workstations may be used. Various printers or plotters may also be employed to produce vertical and map views, such as a HP 750C plotter, commercially available from Hewlett-Packard, Palo Alto, Calif.

Figure 5:
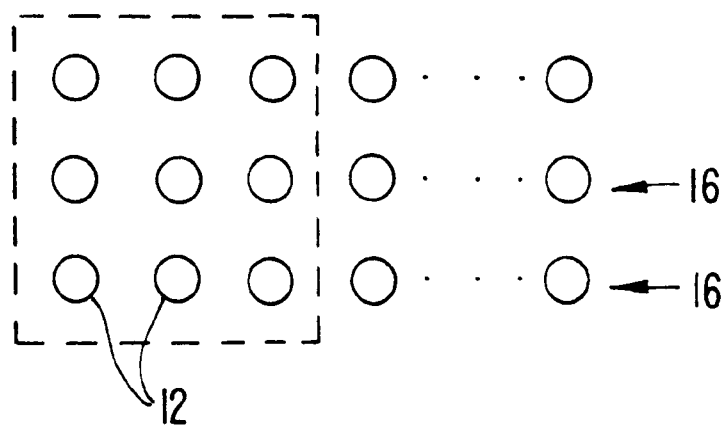
FIG. 5 illustrates three lines of seismic traces of the seismic data of FIG. 1 and shows nine traces that are to be used in computations according to the invention.
Figure 6:
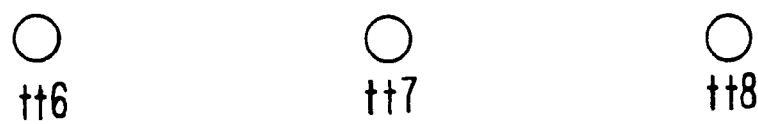
FIG. 6 is a more detailed view of the nine traces of FIG. 5.
Figure 6:
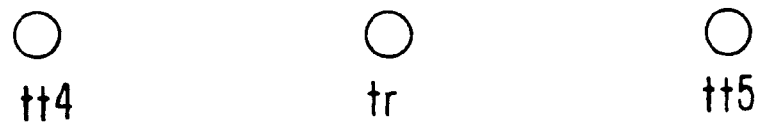
Figure 6:
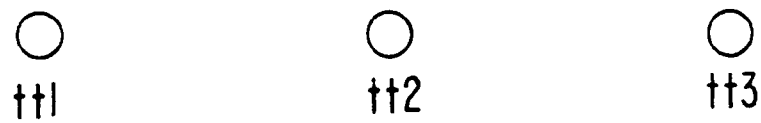

Once data set 10 has been read into computer system 18, analyzation of the seismic data is ready to begin. One exemplary method for analyzing the seismic data is set forth in the flow chart of FIG. 4. As just described, the 3-D seismic signal traces are initially read into the computer's memory as illustrated in step 36. As illustrated in FIG. 5, seismic traces 12 are preferably read into the computer's memory three lines at a time, although it will be appreciated that other schemes for entering the seismic data into the computer's memory may be employed. Conveniently, a unit of nine traces is selected to begin the initial computations as illustrated in phantom line, it being appreciated that other numbers of traces may be included in the unit. For convenience of discussion, a center one of the nine traces is denoted by tr as shown in FIG. 6. Each neighboring trace is denoted by ttn where n can vary between 1 and 8. In the computations, center trace tr is compared with one or more, and preferably two or more, neighbor traces ttn. As such, the comparison may be performed in essentially any direction. For the examples set forth below, center trace tr is compared with all eight neighbor traces ttn, it being appreciated that center trace tr may be compared with any one or more of neighbor traces ttn.

Referring back now to FIG. 4, the method proceeds by selecting a reference trace as illustrated in step 38. Typically, the reference trace is preferably center trace tr as previously described in connection with FIG. 6, although any trace in the unit may be the reference trace. A two-step process is then employed to first determine a preferred direction or orientation from center trace tr and then to perform a comparison with the neighbor trace that lies closest to the preferred orientation or direction as illustrated in steps 40 and 42.

Figure 7:
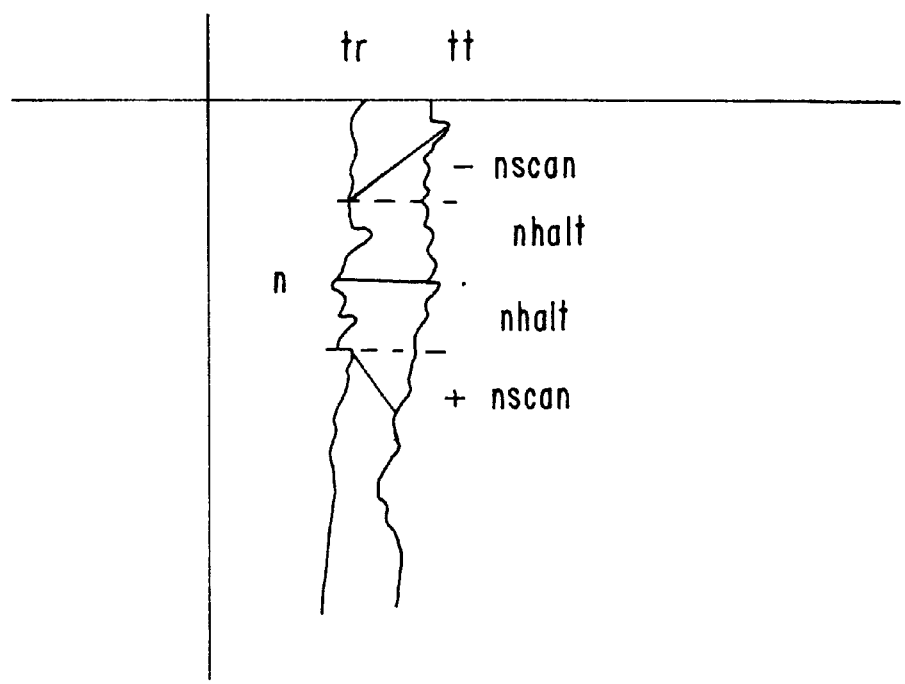
FIG. 7 is a side view of two seismic signal traces illustrating trace windows containing samples used in computations according to the invention.
Figure 8:
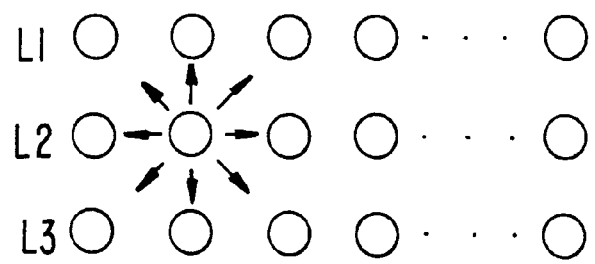
FIG. 8 illustrates the comparison of a center trace with neighbor traces to find a target trace according to the invention.
Figure 9:
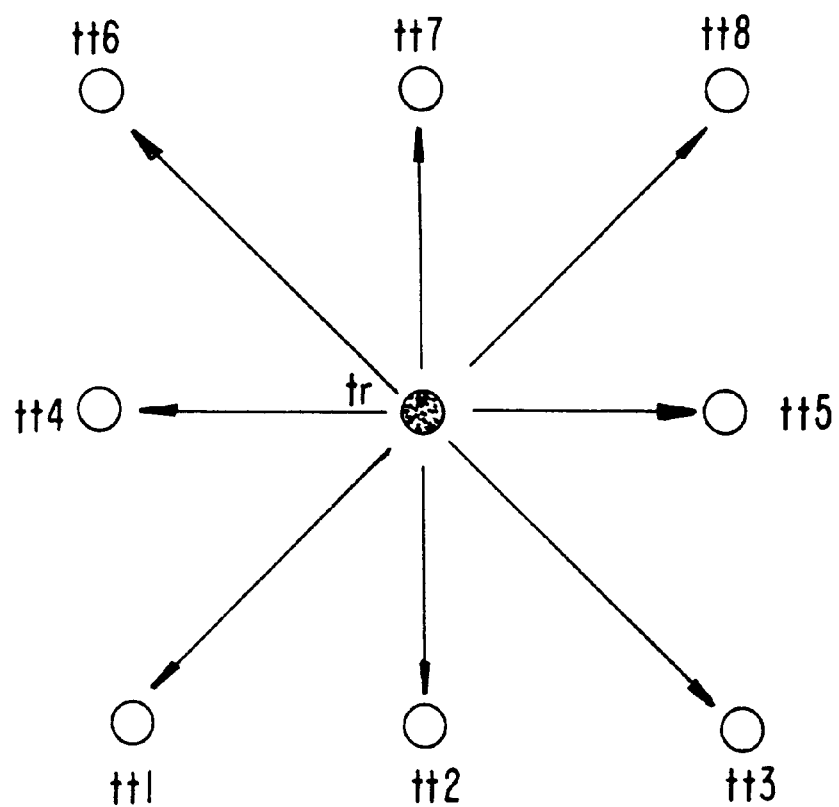
FIG. 9 is a more detailed view of the comparison of FIG. 8.

To compare the reference trace with the neighbor traces, a window of samples on each of the traces is preferably scanned as illustrated in FIG. 7. More specifically, reference trace tr has a trace window that is centered on a sample n that is far enough from the top or bottom to define a window of samples that begin at n−nhalf−nscan and n+nhalf+nscan. The window has a width of 2 * nhalf+1 samples wide and nscan is a number of samples that will provide a search range for similarities. Using the trace window centered on sample n of reference trace tr, a search is performed on the range of trace windows specified by −nscan to +nscan on the desired neighbor trace(s) to find the best reference window to target window similarity.

Referring back now to FIG. 4, to determine a preferred direction, reference trace tr is compared with two or more neighbor traces ttn to find the neighbor trace of least or most similarity depending on the particular data set. This trace is then labelled as a target trace. As just described in connection with FIG. 7, the comparison is performed over the trace window and the best similarity measure is retained for each neighbor trace. These best similarity values are then compared to find some statistical value which in turn will indicate which of the neighboring traces should be the target trace. For example, the best similarity values may be statistically compared using minimums, maximums, averages, medians, and the like.

The index corresponding to the selected target trace is then saved and the similarity computations are discarded. The target index values may then be used to address various quality control issues. For example, target index data field may be output and viewed to illustrate problem areas in the data, to help decide on a specific target selection algorithm, or to apply a process to this field to "clean up the noise." If the data were processed to clean the noise in the target field, the cleaned up data could then be used in the evaluation stage where the reference traces are compared with the target traces as described below.

Figure 10:
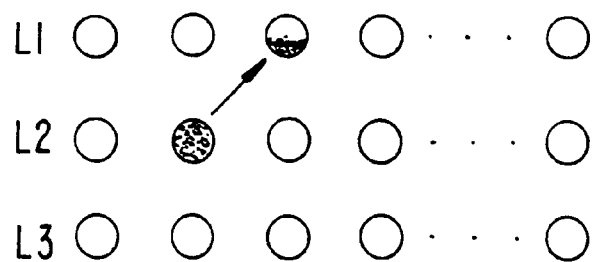
FIG. 10 illustrates the traces of FIG. 8 showing the comparison of the center trace with the target trace to produce a comparison value according to the invention.
Figure 11:
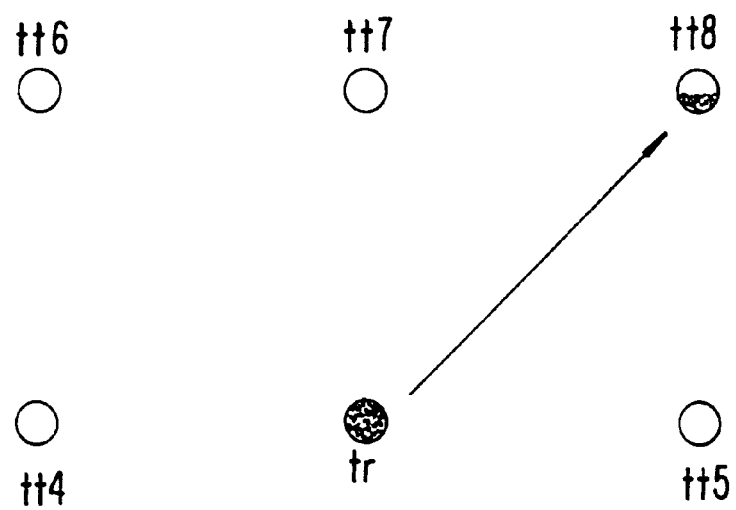
FIG. 11 is a more detailed view of the comparison of FIG. 10.

An exemplary process for comparing the reference trace with neighbor traces is illustrated schematically in FIGS. 8–11. In these figures reference trace tr is illustrated schematically by a solid circle. As indicated by the arrows in FIGS. 8 and 9, reference trace tr is compared with all eight neighbor traces, tt1–tt8, to find which neighbor is the least similar, although in some cases the neighbor trace of most similarity may be used. As illustrated in FIGS. 10 and 11, in this example, trace tt8 is the neighbor trace of least similarity and is indexed as the target trace. As such, target trace tt8 is illustrated with a half filled circle. The computations involving traces tt1–tt8 are then discarded, with the only information preferably being saved is that target trace tt8 defines a preferred direction for subsequent comparisons.

A wide variety of mathematical comparisons may be employed to determine a preferred direction. Preferably the search is performed using a cross-correlation or semblance calculation, although other calculations that may be employed include cross covariance, eigenvalue, and the like. One exemplary equation that may be used to determine the semblance similarity value is as follows:

$$S(n, L) = \frac{\sum_{j=-nhalf}^{j=+nhalf} (tr[n+j] + tt[n+j+L])^2}{2 * \left( \sum_{j=-nhalf}^{j=+nhalf} tr[n+j]^2 + \sum_{j=-nhalf}^{j=+nhalf} tt[n+j+L]^2 \right)}$$

Where the variables are:

L=lag
n=reference sample
tr=reference trace
tt=target trace
j=summing index

Figure 4:
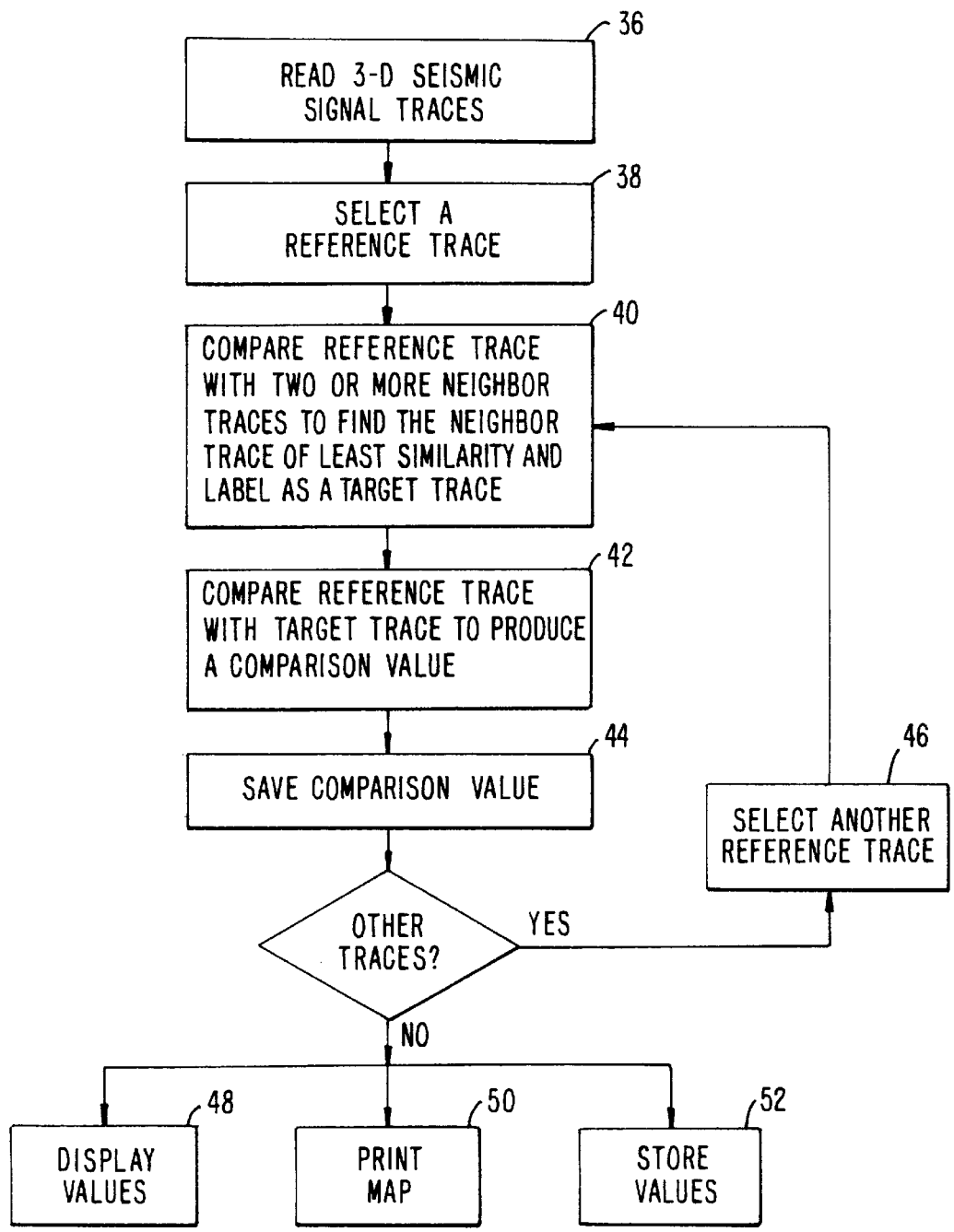
FIG. 4 is a flow chart illustrating an exemplary method for processing and analyzing seismic data according to the invention.

Using the window about sample n on reference trace tr, the target trace (in this example trace tt8) is compared to produce a comparison value as illustrated in step 42 of FIG. 4. A preferred mathematical comparison is a best similarity search using a Manhattan distance calculation over the range of −nscan to +nscan. The best similarity value is then output for sample n. Although a Manhattan distance calculation is preferably employed, other calculations that may be employed include cross-covariance and the like. The equation for computing the Manhattan similarity value is given by:

$$M(n, L) = \frac{\sum_{j=-nhalf}^{j=+nhalf} |tr[n+j] - tt[n+j+L]|}{\sum_{j=-nhalf}^{j=+nhalf} (|tr[n+j]| + |tt[n+j+L]|)}$$

for $$\sum_{j=-nhalf}^{j=+nhalf} tr[n+j] \neq 0$$

rejects dead reference window and $$\sum_{j=-nhalf}^{j=+nhalf} tt[n+j+L] \neq 0$$

rejects dead target window.

Figure 12:
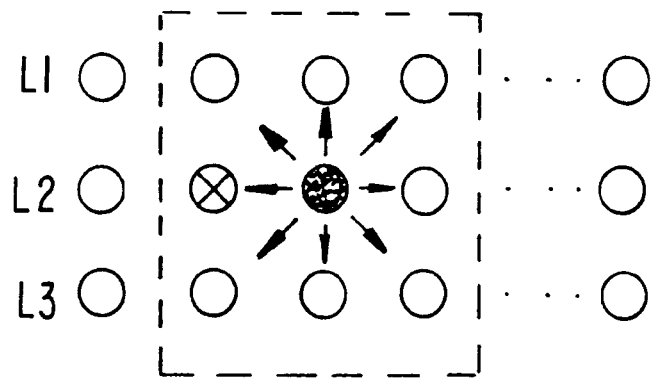
FIG. 12 illustrates the traces of FIG. 10 after the comparison value has been assigned to the reference trace and a second reference trace has been selected and compared with neighbor traces to find a target trace for the second reference trace according to the invention.
Figure 13:
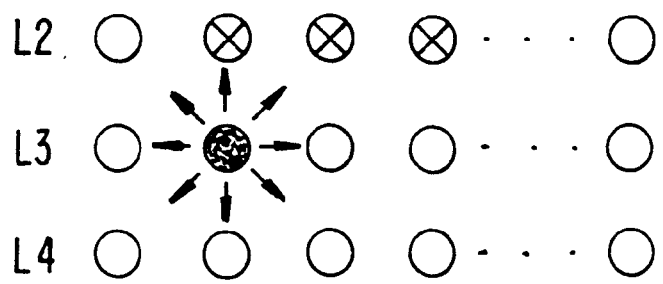
FIG. 13 illustrates a method for reading in a new line of seismic traces and comparing a reference trace of a new line of traces with neighbor traces to find a target trace for the reference trace according to the invention.

As illustrated in Step 44 of FIG. 4, this comparison value is then saved. Another reference trace in the data set is then selected as the reference trace, as illustrated in step 46, and the process is repeated for each of the traces in the data set. One exemplary way to proceed through the data set is illustrated schematically in FIGS. 12 and 13. In FIG. 12, the initial reference trace is marked with an X indicating that a comparison value has been produced for that trace. The unit of nine traces then shifts one to the right as illustrated in phantom line in FIG. 12. Another reference trace is then selected as indicated by the solid circle and comparisons are made with each neighboring trace in a manner similar to that previously described. As illustrated in FIG. 13, once each of the traces in line 2, i.e., the middle line, has been assigned a comparison value, line 1 is removed and a new line of data, line 4, is read into the memory. Line 3 then becomes the middle line and its traces are compared with neighboring traces in a manner similar to that just described to compute comparison values for each of its traces.

Once all the trace samples have been processed, the comparison values may either be displayed on the computer monitor, printed as a vertical view or a map view, or saved in storage as illustrated in steps 48–52, respectively, of FIG. 4. As in known in the art, such values may be viewed using commercially available display packages, such as the Seisworks display package from Landmark Graphics Corporation.

Figure 14:
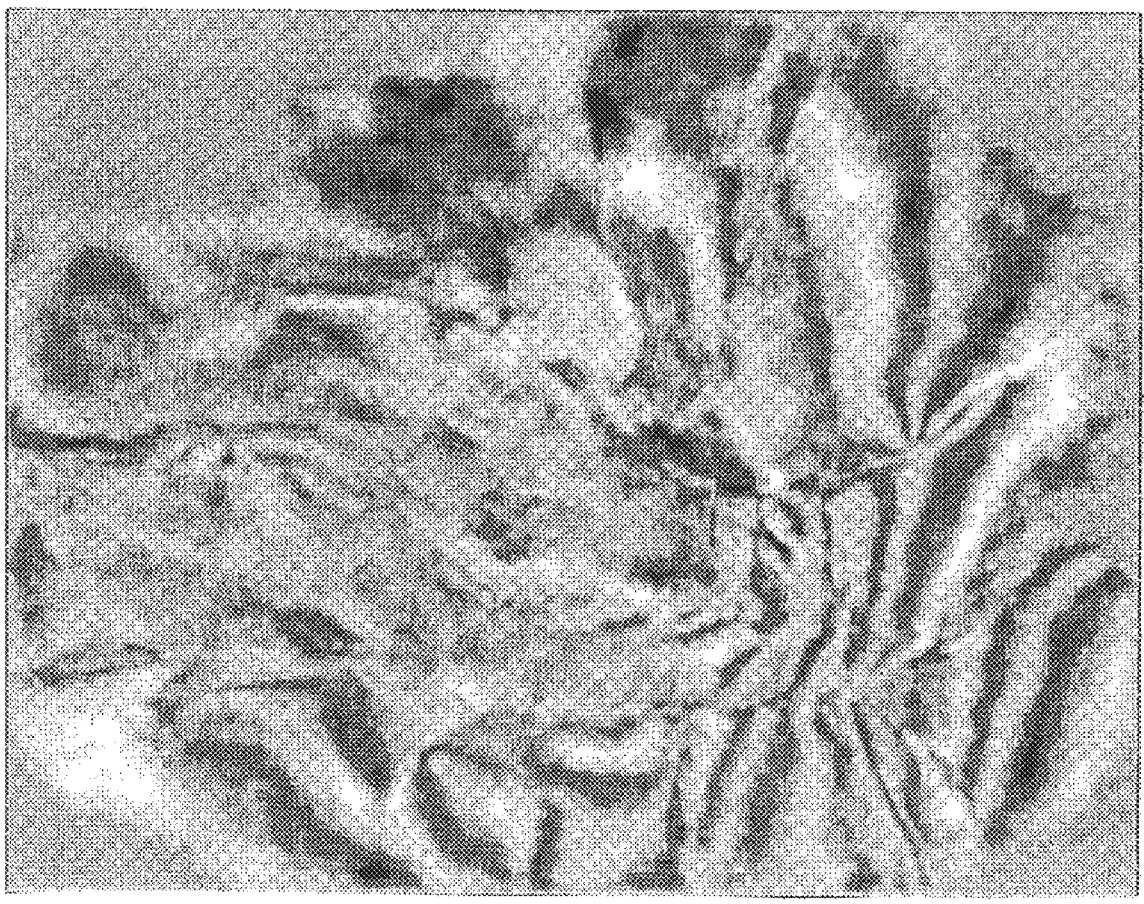
FIG. 14 illustrates a time slice of seismic data.
Figure 15:
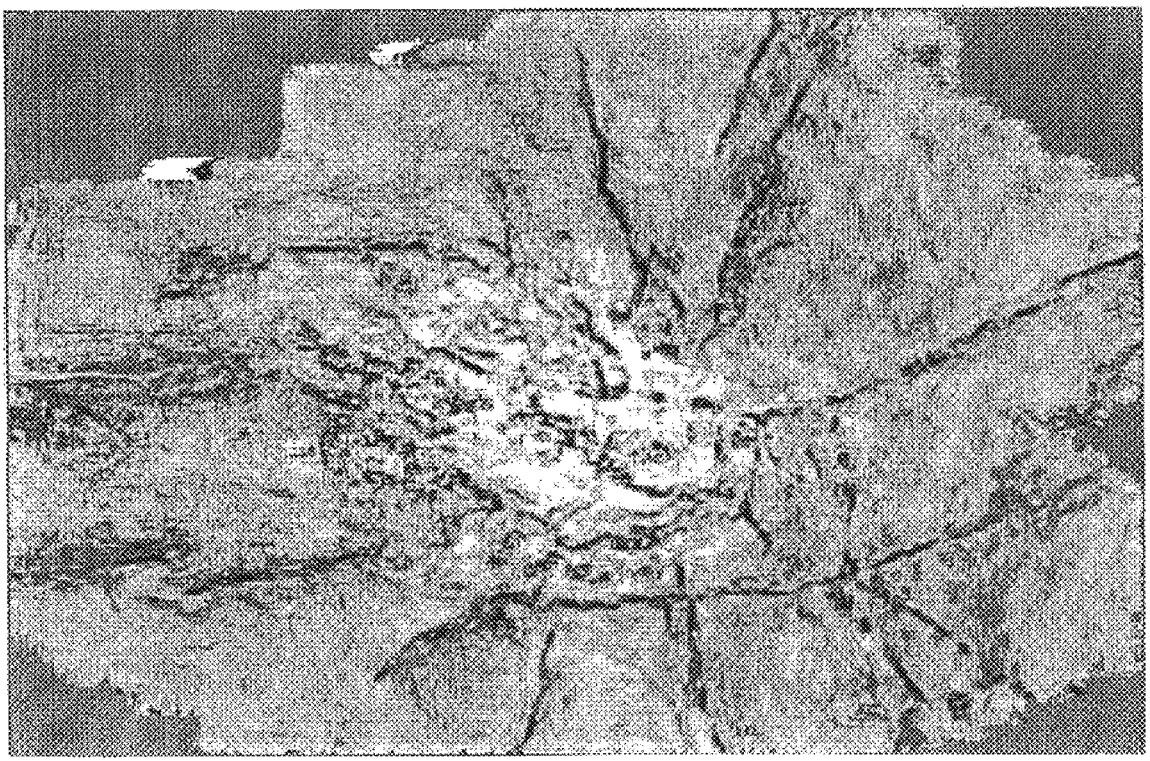
FIG. 15 illustrates a map view (time slice) of the data of ig. 14 after being processed according to the present invention.

Referring now to FIG. 14, a horizontal time slice map for a particular data set is shown. After the method set forth in FIG. 4 has been performed on the data set, the resulting time slice is shown in FIG. 15. As shown, the method of the invention is able to delineate faults and stratigraphic features that were not apparent in the time slice of FIG. 14.

The invention has now been described in detail for purposes of clarity and understanding. However, it will be appreciated that various changes and modifications may be made which are included within the scope of the appended claims. Hence, all such modifications or changes are intended to be included within the scope of the following claims.

What is claimed is:

1. A method for analyzing seismic data, the method comprising:
   a) providing a set of three dimensional seismic signal traces;
   b) comparing a reference one of the traces with at least two neighboring traces to find a neighbor trace of least or most similarity to the reference trace and defining the neighbor trace of least or most similarity to be a target trace;
   c) comparing the reference trace with the target trace to produce a comparison value; and
   d) saving the comparison value.

2. A method as in claim 1, further comprising displaying the comparison value.

3. A method as in claim 1, further comprising selecting another reference trace from the set of traces, and repeating steps b) through d).

4. A method as in claim 3, further comprising displaying the comparison values in map form.

5. A method as in claim 1, wherein the neighboring traces are included in two different lines of signal traces.

6. A method as in claim 1, further comprising comparing the reference trace with eight adjacent neighbor traces located in three different lines of signal traces to find the target trace.

7. A method for analyzing seismic data, the method comprising:
   a) providing a set of three dimensional seismic signal traces;
   b) comparing a reference one of the traces with at least two neighboring traces to find a neighbor trace of least or most similarity to the reference trace and defining the neighbor trace of least or most similarity to be a target trace, wherein the reference trace is compared with the neighboring traces using a semblance comparison;
   c) comparing the reference trace with the target trace to produce a comparison value; and
   d) saving the comparison value.

8. A method for analyzing seismic data, the method comprising:
   a) providing a set of three dimensional seismic signal traces;
   b) comparing a reference one of the traces with at least two neighboring traces to find a neighbor trace of least or most similarity to the reference trace and defining the neighbor trace of least or most similarity to be a target trace, wherein the reference trace is compared with the target trace using a Manhattan similarity comparison;
   c) comparing the reference trace with the target trace to produce a comparison value; and
   d) saving the comparison value.

9. A method for analyzing seismic data, the method comprising:
   a) providing a set of three dimensional seismic signal traces;
   b) comparing a reference one of the traces with at least two neighboring traces to find a neighbor trace of least or most similarity to the reference trace and defining the neighbor trace of least or most similarity to be a target trace and discarding the comparison of the reference trace with the neighbor traces prior to performing step c);
   c) comparing the reference trace with the target trace to produce a comparison value; and
   d) saving the comparison value.

10. A method for analyzing seismic data in a computer having a processor and a memory, the method comprising:
    a) reading a set of three dimensional seismic signal traces into the memory of the computer;
    b) comparing with the processor a reference one of the traces with at least two neighboring traces to find a neighbor trace of least or most similarity to the reference trace and defining the neighbor trace of least or most similarity to be a target trace;
    c) comparing with the processor the reference trace with the target trace to produce a comparison value; and
    d) saving the comparison value in the memory.

11. A method as in claim 10, further comprising displaying the comparison value on a display screen of the computer.

12. A method as in claim 10, further comprising selecting with the processor a second reference trace from the set of traces, and repeating steps b) through d).

13. A method as in claim 12, wherein the seismic traces are provided in lines, and further comprising reading three lines of seismic traces into the memory at a time.

14. A method as in claim 13, wherein the reference trace is located in a middle one of the lines of seismic traces.

15. A method as in claim 14, wherein the second reference trace is located in the middle line of traces adjacent the first reference trace.

16. A method as in claim 15, further comprising reading another line of seismic traces into the memory after a last one of the traces in the middle line has been compared with a target trace.

17. A computer system, comprising:
    a reading device to read stored seismic data;
    a processor;
    a memory;
    code to operate the reading device to read into the memory a set of three dimensional seismic signal traces;
    code to compare with the processor a reference one of the traces with at least two neighboring traces to find a neighbor trace of least similarity to the reference trace and to define the neighbor trace of least similarity as a target trace;
    code to compare with the processor the reference trace with the target trace to produce a comparison value; and
    code to save the comparison value in the memory.

18. A device as in claim 17, further comprising a display screen and code to display the comparison value on the display screen.

19. A device as in claim 17, further comprising a printer and code to print the comparison value.

20. A machine readable medium having stored thereon code to compare a reference trace of a set of three dimensional seismic signal traces with at least two neighboring traces to find a neighbor trace of least or most similarity to the reference trace and to define the neighbor trace of least or most similarity as a target trace; code to compare the reference trace with the target trace to produce a comparison value; and code to save the comparison value.

21. A map produced according to the process of
   a) providing a set of three dimensional seismic signal traces;
   b) comparing a reference one of the traces with at least two neighboring traces to find a neighbor trace of least or most similarity to the reference trace and defining the neighbor trace of least or most similarity to be a target trace;
   c) comparing the reference trace with the target trace to produce a comparison value; and
   d) displaying the comparison value in map form.

* * * * *